(12) United States Patent
Despres et al.

(10) Patent No.: US 7,990,988 B2
(45) Date of Patent: Aug. 2, 2011

(54) SHARED-MANAGEMENT DEVICE

(75) Inventors: Rémi Despres, Levallois-Perret (FR); Rémi Lucet, Verneuil-sur-Seine (FR)

(73) Assignee: Streamcore System SAS, Colombes (FR)

( * ) Notice: Subject to any disclaimer, the term of this patent is extended or adjusted under 35 U.S.C. 154(b) by 1025 days.

(21) Appl. No.: 10/491,206

(22) PCT Filed: Sep. 23, 2002

(86) PCT No.: PCT/FR02/03241
§ 371 (c)(1),
(2), (4) Date: Aug. 4, 2004

(87) PCT Pub. No.: WO03/027868
PCT Pub. Date: Apr. 3, 2003

(65) Prior Publication Data
US 2004/0246969 A1 Dec. 9, 2004

(30) Foreign Application Priority Data
Sep. 27, 2001 (FR) .................................. 01 12440

(51) Int. Cl.
*H04L 12/28* (2006.01)
*H04L 12/56* (2006.01)
*G06F 13/00* (2006.01)
*G06F 13/28* (2006.01)

(52) U.S. Cl. ...................... 370/412; 370/395.4; 711/151
(58) Field of Classification Search ................ 370/395.4
See application file for complete search history.

(56) References Cited

U.S. PATENT DOCUMENTS

| | | | | |
|---|---|---|---|---|
| 4,922,488 | A * | 5/1990 | Niestegge | 370/413 |
| 5,255,265 | A * | 10/1993 | Eng et al. | 370/416 |
| 5,592,476 | A * | 1/1997 | Calamvokis et al. | 370/390 |
| 6,014,367 | A * | 1/2000 | Joffe | 370/230 |
| 6,101,193 | A * | 8/2000 | Ohba | 370/429 |
| 6,157,614 | A * | 12/2000 | Pasternak et al. | 370/236 |
| 6,157,654 | A * | 12/2000 | Davis | 370/412 |
| 6,269,079 | B1 * | 7/2001 | Marin et al. | 370/230 |
| 6,389,019 | B1 * | 5/2002 | Fan et al. | 370/395.42 |
| 6,574,770 | B1 * | 6/2003 | Daudelin | 714/776 |
| 6,804,249 | B1 * | 10/2004 | Bass et al. | 370/412 |
| 6,950,400 | B1 * | 9/2005 | Tran et al. | 370/236 |

FOREIGN PATENT DOCUMENTS

| | | |
|---|---|---|
| EP | 1 081 597 A1 | 3/2001 |
| WO | WO 99 28828 A1 | 6/1999 |

* cited by examiner

*Primary Examiner* — Hassan Kizou
*Assistant Examiner* — Andrew Chriss
(74) *Attorney, Agent, or Firm* — Hensley, Kim & Holzer, LLC

(57) ABSTRACT

The invention concerns a scheduler for sharing a resource comprising a storage unit for storing user deadlines, FIFO storage units, associated each with a first increment value (d(j)) and, for some of them (c(j, i), with a second increment value (d(i)), for storing user-identifiers. The scheduler comprises a management unit selecting one of the FIFO storage units to serve the user designated as next to serve for the resource, recycling his user-identifier, and a recycling decision unit for redirecting, in accordance with conditions, which include a comparison between the second increment value of the FIFO where the user is going and the first increment value from where the user is coming.

20 Claims, 6 Drawing Sheets

SHARED-MANAGEMENT DEVICE

CROSS REFERENCE TO RELATED APPLICATIONS

This application claims priority to PCT International patent application number PCT/FR02/03241, filed on Sep. 23, 2002, that claims priority to French patent application number 01 12 440, filed on Sep. 27, 2001, the entire disclosure of which is incorporated herein by reference.

BACKGROUND OF THE INVENTION

The invention relates to an allocation of an information processing or telecommunication resource shared between several users. More particularly, it relates to a management device permitting the allocation of a resource to each user.

At any determined moment, this device selects a user from the group of users requesting a resource allocation. This selection takes place in accordance with, in particular, the value of a waiting time or (wait) associated with each user. In practice, the resource is allocated to each selected user in accordance with a predetermined quantity of services. Each predetermined quantity of services is contained in a limited services slot (shared processing time or packet switching).

In the prior art of EP 98 955 731.9, the device is suitable for the grouping of the users by classes each comprising a memory of the FIFO (First In First Out) type. Thus, each class is determined according to a class criterion corresponding to a "share-parameter, maximum quantity of services" standard pair value. Each user has a priority claim on the resource which is represented by the "share-parameter", also called "share". In another more developed technique, the class allocated to each user corresponds to a "share-parameter, maximum quantity of services" pair corresponding to a predetermined value.

Only the first users at the head of a FIFO are able to be selected by the device. The users at the head of a FIFO correspond to the users whose waiting time is the least advanced. In these solutions, the selection processing time remains independent of the number of connections.

However, these solutions neither propose that the user obtain a quantity of services that can vary according to his needs, nor allow him to vary the "share-parameter".

SUMMARY OF THE INVENTION

The invention aims in particular to improve the situation.

To this end it offers a structure of FIFO memories grouped into different classes in such a way that the user can vary, in accordance with certain conditions, his quantity of services and his "share-parameter".

The invention provides a scheduler for the sharing of a resource, of the type comprising:
- a memory capable of storing, for users, respective order of quantities, called waiting times,
- memories of FIFO type, each associated with a value, called first increment value, for storing user-identifiers, and
- a management unit, capable:
  - of designating one of the FIFO memories, the leaving first user-identifier of which is the "next to be served" by the resource, this designation taking place in accordance with first conditions which include the order of the waiting times of the leaving first users,
  - of recycling the user-identifier into one of the FIFOs, and
  - of increasing the waiting time of a recycled user by the first increment value of the FIFO where this user is located.

In order to best meet the services needs of the users,
- at least one of the FIFO memories is also associated with a second increment value, and
- the management unit comprises a recycling-decision unit capable, after service of a user, of redirecting the identifier of this user to one of the FIFOs, in accordance with second conditions, which include a comparison between the second increment value of the FIFO where the user is going and the first increment value of the FIFO from which the user is coming.

The invention provides a scheduling process for the sharing of a resource, comprising the following steps:
a. the storing of user-identifiers in FIFO memories each associated with a value, called first increment value, at least one of the FIFO memories also being associated with a second increment value,
b. the designation, among the said FIFO memories, of a FIFO memory of which the leaving first user-identifier is the "next to be served" by the resource, this designation taking place in accordance with first conditions which include the order of the waiting times of the leaving first users,
c. the recycling of the user-identifier, redirecting this user-identifier into one of the FIFOs, in accordance with second conditions, which include a comparison between the second increment value of the FIFO where the user is going and the first increment value of the FIFO from which the user is coming, and
d. the increasing of the waiting time of a recycled user by the first increment value of the FIFO where this user is located.

The invention covers a software module, which can be defined as comprising the functions for executing the process steps a. to d. above, and/or as comprising the functions of the scheduler defined above.

The invention also covers a computer system which can be defined as comprising the scheduler defined above. The computer system also comprises an item of telecommunications equipment.

Formulae for the invention are defined in annex 1.

DETAILED DESCRIPTION OF PREFERRED EMBODIMENTS

The drawings and annex contain, for the most part, elements of certain character.

They can thus not only to serve to create a better understanding of the description but also contribute to the definition of the invention, as the case may be.

The present document may contain details that are able to be protected by author's rights or copyright. The owner of the rights does not object to the identical reproduction by whomsoever of this patent document, as it appears in the files and/or publications of patent offices. On the other hand, for the rest he reserves the whole of his author's rights and/or copyright.

Figure 1:
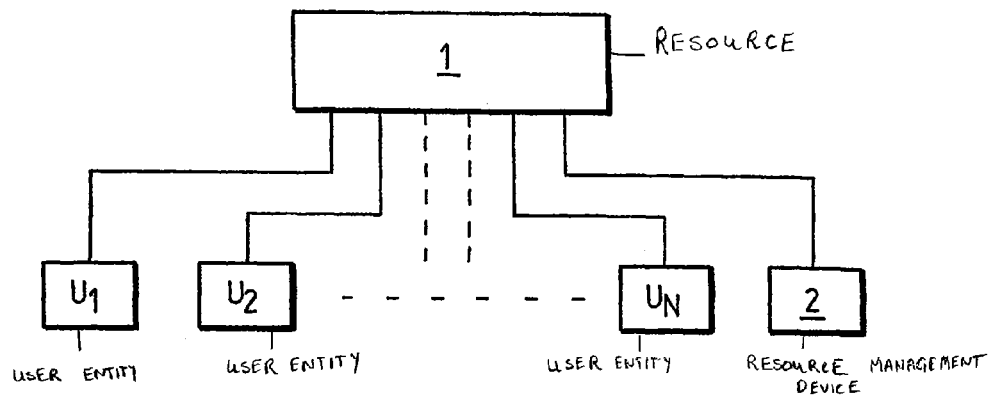
FIG. 1 illustrates schematically interactions between the resource, the resource-management device and N users $u_1$, $u_2$, ... $u_N$ (user entities)

Reference is made first of all to FIG. 1 comprising a resource 1 such as a data transmission link or a central processing unit, and shared between a number N of user entities, $u_1, \ldots u_N$, for example between N applications of computers or N communications in network nodes. A device 2 for managing the resource 1, assigns the latter by quantity of services to successively selected user entities. Each allocation of service to a user entity $u_x$ is made for a chosen quantity of services: the quantum $Q_X$ of this allocation. The user entity can consume, or not, the whole of this quantum.

Figure 2:
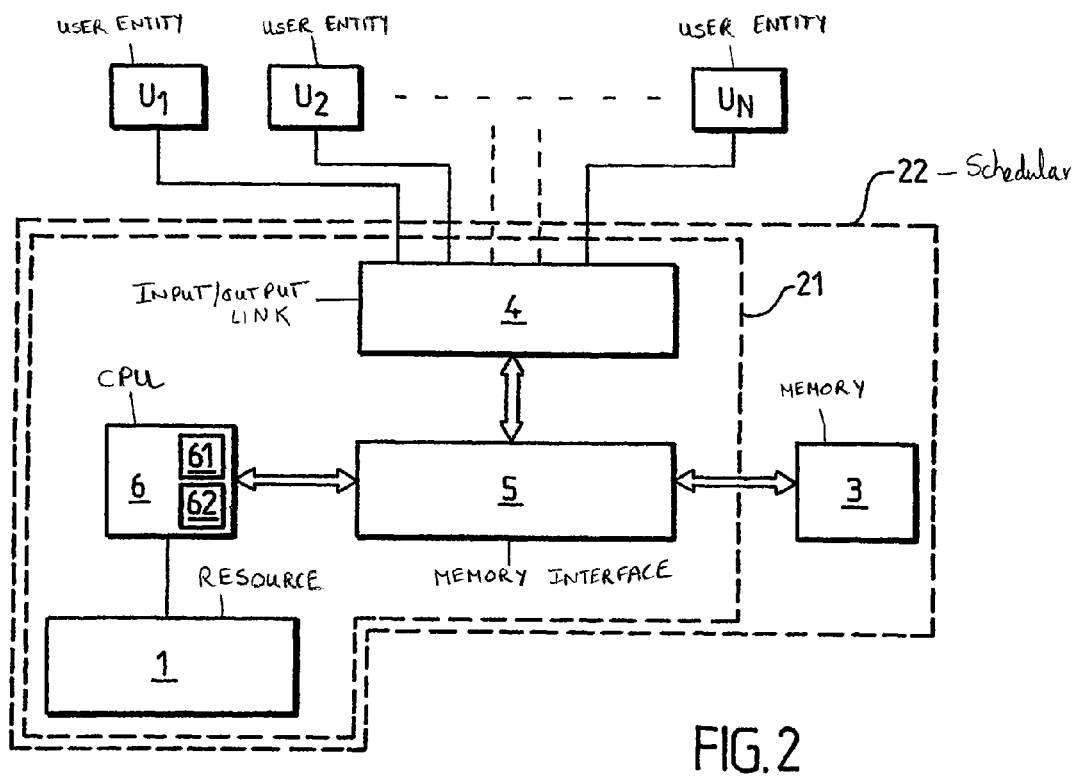
FIG. 2 illustrates schematically the interactions between different elements comprised by the device and the N user entities.

In FIG. 2, the resource-management device 2 of FIG. 1 includes an input/output link 4, for example a communication bus with the N user entities. It also includes a working memory 3, where in particular data relating to the user entities $u_1 \ldots u_n$, are recorded as well as a memory connection means 5, for example a memory interface between the input/output link 4 and the memory 3. Finally, the described device includes a decision-making means 6 (forming part, for example, of a central processing unit) comprising, according to the invention, a unit 62 making pre-selection decisions between users, capable in particular of selecting one of the entities in order that the resource is assigned to him and a unit 61 for making recycling decisions, capable in particular of redirecting an entity into memory, in accordance with certain conditions, once it has been served, as described below. The assembly comprised by the resource 1, memory interface between the input/output link 4, the memory connection means 5, and the decision-making means 6 is called the management unit 21 working in connection with the memory 3. The assembly formed by the management unit working in connection with the memory 3 is designated the scheduler 22.

The device provides a shared management of a resource between several users. In order to do this, the resource is allocated successively to each user in accordance with, for example, quantities of services Q(u). Each quantity of services Q(u) (also called quantum) can designate a period of services allocated to a user. Thus, there is attributed to a selected user entity $u_s$ the period of services $Q_s$ relating to the execution of a task by the resource. Another parameter is also associated with each user, called "share-parameter", recorded in the working memory 3. This "share-parameter" is associated with each user entity in accordance with criteria that are outside the resource-management device 2.

In the case of a management in shared time, these "share-parameters" (also called "loads") are proportional to desired average execution speeds for each user entity. Thus, in order to respect an equity of sharing between the user entities and to best respect the execution speed requirements desired by each user entity, the resource manager 2 must allocate quantities of services $Q_x$ to each user entity $u_x$ in order that, accumulated over any periods, these quantities of services $Q_x$ are best proportional to the load $W_x$ of the user entity $u_x$.

Thus, the load of the resource $\gamma(t)$ as a function of time t and for N user entities $u_1 \ldots u_N$ is defined by relationship (1), given in annex 1 to the present application.

The prior art is presented in the following document:

[1]—"Allocation algorithm of a central unit for calculators operated in shared time" (R. Després and A. Bache, *Annales des communications*, p. 19, 1972).

The Applicant provides a model for the management of a resource in shared time that applies to a parallel treatment of user entities. The resource is allocated alternatively for tasks in the course of execution, claiming a treatment equivalent to the full possession of the resource during a time-quantum Q. Thus, the greater the number of user entities making requests, the more slowly each task is executed. For each user entity $u_x$ newly making requests, the date $d_x(t)$ of his last quantum request $Q_x(t)$ at moment t is known. Starting from the quantum $Q_x(t)$, the future date $f_x(t)$ on which the quantum $Q_x(t)$ will be fully executed can be assessed on condition that the load $\gamma(t)$ of the resource evolving in time, as defined by relationship (2) of annex 1, is known.

Arbitrarily, a virtual time scale is defined such that at the moment t0 (t) the load $\gamma(t)$ of the resource is nil at that moment. The quantum q(t) is defined in relationship (3) of annex 1 according to the virtual time $t_0(t)$. Thus, a waiting time for the end of execution of the quantum $Q_x(t)$ is estimated according to relationship (4) or (5) of annex 1. For each user entity $u_x$, this waiting time $E_x(t)$ progresses by a value $Q_x/W_x$ with each execution of a services request from the user entity.

The resource manager 2 also keeps a virtual time V that is incremented, with each execution of a services request from a selected user entity $u_s$, by a quantity $pV(u_s)$ as defined in relationship (6) of annex 1. In order to establish an order of priority of satisfaction of the requests from the user entities, an eligibility status defined in document [1] is associated with each user entity. In addition to this eligibility status, a comparison of the virtual waiting time of the user entity at virtual time V of the resources manager must satisfy certain criteria.

The resources manager then allocates a quantum $Q_x$ to the eligible user entity $u_x$ that has the smallest virtual waiting time.

This technique has a major drawback: the processing time needed for the resources manager to select a user entity depends on the number N of user entities.

The Applicant thus provided solutions in the following documents:

[2] "A packet switching network with graceful saturated operation" (R. Després, International Conference and Computer Communications, P. 345, 1972),

[3]—EP 98 955 731.9, "Device for managing a resource between several users".

These documents propose additional solutions based on a management of a limited number of queues of user entities. These queues are of FIFO type. In the document referenced [2], the resources manager prescribes standard "load-quantum" pair values for the user entities. Each FIFO also corresponds to a "load-quantum" standard pair value. Each FIFO has a corresponding virtual waiting time and a virtual waiting time progression as well as an eligibility status. At a given moment, for the eligible FIFO which has the smallest virtual waiting time, the resources manager allocates a quantum to the entity at the head of the FIFO.

Thus, the processing time is independent of the number of user entities and only depends on the number of FIFOs.

However, the "load-quantum" standard pair values do not allow an equity of sharing to be ensured between the user entities.

Thus the document referenced [3] defines, for each FIFO, a class c associated with an interval d(c). Each user entity is assigned to a class such that the maximum quantum Q(u) (or maximum wait) desired by this user entity corresponds to the interval d(c) of this class such that $Q_{max}(u)=d(c)\times W(u)$.

Thus, when the resource manager selects a user entity u at the head of a FIFO of interval d(c) and the virtual waiting time E(u) of which is the smallest among those of the user entities appearing at the head of their FIFO, the resource manager allocates a quantum $Q(u)=d(c) \times W(u)$ to the selected user entity u.

The virtual waiting time of each user entity progresses, after allocation of the quantum $Q(u)$ associated with the load $W(u)$, by a quantity equal to the interval of the class in which the user entity u is located.

The document referenced [3] also proposes an embodiment in the case of a variable number of user entities. In this case, the resources manager distinguishes between two types of classes: a class of user entities newly making requests and a class of user entities who were already making requests before the current request. The waiting times of the user entities newly making requests are then determined starting from an internal variable of the resources manager, preferably from the virtual time V.

However, the technique proposed in the document referenced [3] does not satisfy a user entity wishing to change a quantity of services Q and/or share-parameter W over time. In practice, in the case of packet switching management for example, a small size packet can wait just as long as a large size packet for the same user entity.

For constant processing times, the aim of the invention is to achieve the aims of independence simultaneously from the loads of the user entities and the quanta of the user entities. Moreover, each user entity u can request a quantum Q and a load W that can vary over time.

Figure 4:
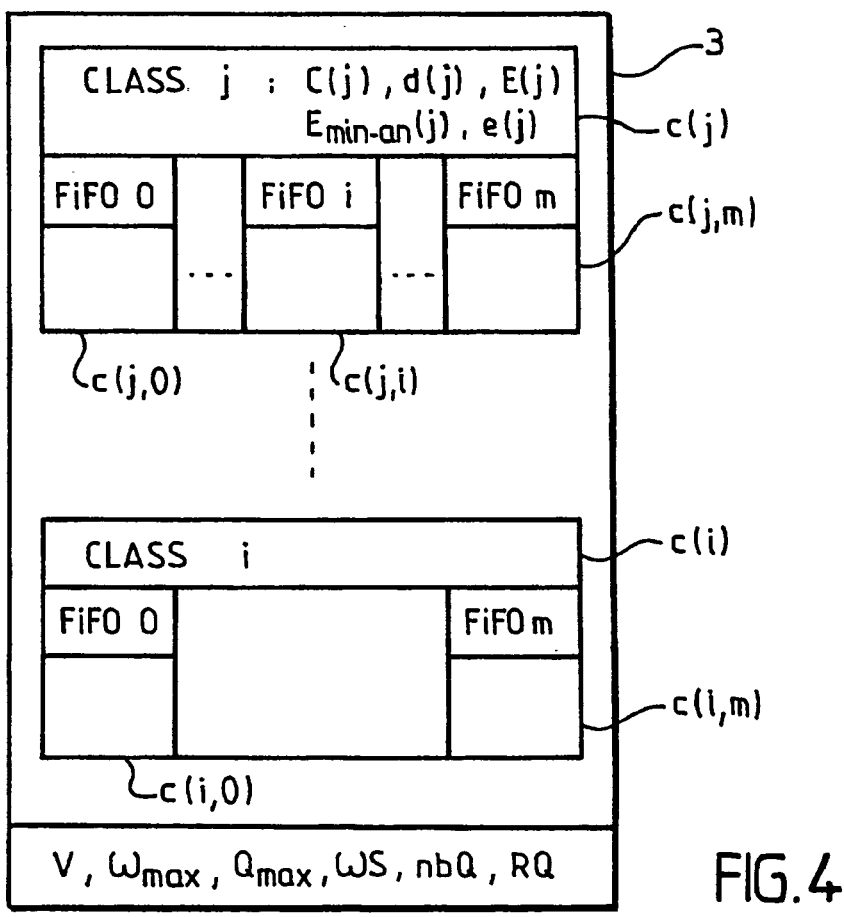
FIG. 4 represents schematically the working memory of the device.

The resources manager according to the invention is based on a working memory 3 as represented in FIG. 4.

Thus, the working memory 3 is divided into several classes i, indexed from 1 to m, marked $c(i)$. The classes $c(i)$ are of respective intervals $d(i)$, these classes $c(i)$ are also called interval classes. Each user entity u is assigned to the interval class $c(i)$ such that, for a load $W(u)$ chosen by the user entity, the quantum $Q(u)$, chosen in accordance with determined conditions, fits the inequality:

$$d(i)Q(u)/W(u) < d(i+1).$$

The user entity is then assigned to the interval class $c(i)$. In the case of a new user entity u, the latter is assigned to the FIFO 0 queue of the class $c(i)$ (i.e. the queue represented by $c(i, 0)$) corresponding to the queue of new users.

The virtual waiting time $E(u)$ of the user entity is incremented by the interval $d(i)$ of the class $c(i)$ in which the user entity is located.

After a first allocation of the resource in accordance with the load $W(u)$ and the quantum $Q(u)$ chosen by the user entity, the latter can effect a new request for allocation of the resource in accordance with a new quantum, called current quantum $Q_a(u)$, and/or a new load called current load $W_a(u)$. The user entity u is then assigned to a new interval class $c(j)$ such that $d(j) Q_a(u)/W_a(u) < d(j+1)$. The user entity u then enters the queue i, also marked $c(j, i)$, corresponding, in the class $c(j)$, to the queue of the old user entities previously assigned to the class $c(i)$.

Thus, a queue $c(j, i)$ depends on the interval $d(j)$, also called first increment value of the class $c(j)$ and on the interval $d(i)$, also called second increment value of the class $c(i)$.

It will be understood that each class, indexed from 1 to m, is comprised of m+1 queues of FIFO type indexed from 0 to m. The queue 0 (also marked $c(j,0)$ in the class $c(j)$) corresponds to the queue of the new user entities and the queues indexed from 1 to m correspond to the queues of the old user entities of the classes 1 to m.

In a possible realization, a user entity is recorded in a FIFO memory in the form of a user-identifier that can be comprised of attributes of the user entity.

Figure 3:
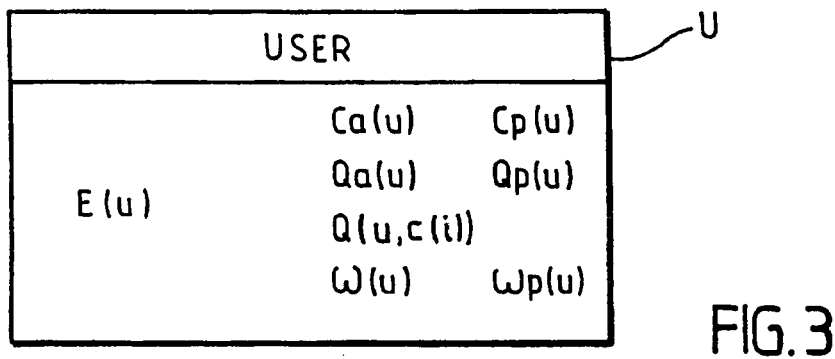
FIG. 3 represents schematically the attributes of any user u.

Thus, for each user entity u, the attributes of FIG. 3 are defined, comprising attributes that can vary in time:
- $Q(u,c(i))$, the list of the quanta allocatable to the user that are associated with the classes $c(i)$, for the load of the moment,
- $W_p(u)$, the previous chosen load of the user entity,
- $W_a(u)$, the current chosen load of the user entity,
- $Q_p(u)$, the previous quantum of the user entity,
- $Q_a(u)$, the current quantum of the user entity,
- $c_p(u)$, the previous class corresponding to $W_P(u)$ and $Q_P(u)$,
- $c_a(u)$, the current class corresponding to $W_a(u)$ and $Q_a(u)$,
- $E(u)$, the virtual waiting time of the user entity.

In the same way, in the memory 3 of FIG. 4, for each class $c(j)$ a certain number of attributes is defined comprising:
an attribute fixed in time:
- $d(j)$, its interval, attributes that can vary in time:
- $e(j)$, its eligibility status,
- $E(j)$, its virtual waiting time,
- $E_{min-en}(j)$, the minimum waiting time among the waiting times of old users at the head of the FIFO.

In the same way, the resource manager 2 defines several attributes in the memory 3 of FIG. 4:
attributes fixed in time:
- $W_{max}$, the maximum load allocatable to a user entity,
- $Q_{max}$, the maximum quantum allocatable to a user entity,
- nbQ, the number of different possible quanta allocatable to a user entity after each assignment of the resource,
- RQ, the geometric progression of the quanta sequences, allocatable to a user entity, attributes that can vary in time:
- V, the virtual time of the device,
- WS, the total load of the device corresponding to the sum of the loads allocated to each user entity.

In the remainder of the description, each parameter is described in its use according to the invention.

Figure 5:
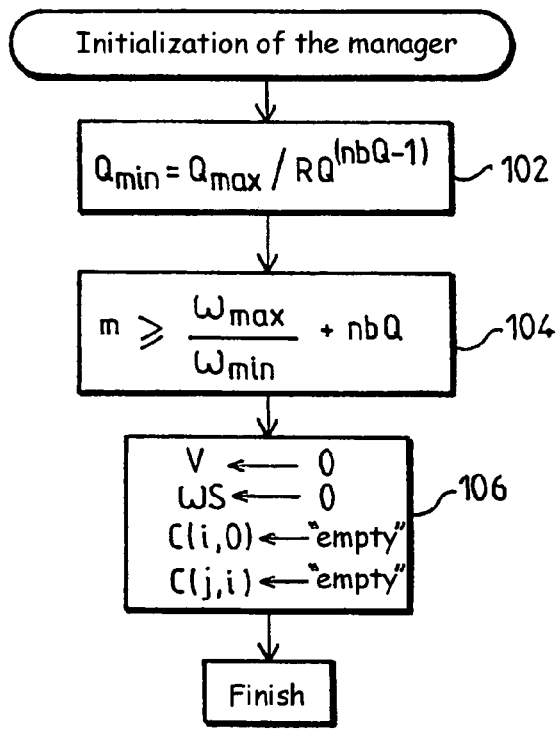
FIG. 5 represents a flow chart of the initialization of the manager according to the invention.

FIG. 5 presents the initialization of the resource manager according to the invention.

Thus, according to step 102, the minimum quantity allocatable to a user entity is calculated in accordance with the maximum quantum $Q_{max}$ allocatable to a user entity, the geometric ratio RQ of the geometric sequences of the allocatable quanta, and the number of allocatable quanta nbQ. At step 104, the number of classes m, also determining the number m+1 of FIFOs per class, is an integer calculated as a function of the number of allocatable quanta nbQ and the integer corresponding to the ratio $W_{max}/W_{min}$.

At step 106, the resource manager initializes the virtual time V and the total load of the manager WS to zero. For each of the m classes $c(i)$, the resource manager also initializes to "empty" the queue of the new users $c(i,0)$ and the m queues of old users $c(j, i)$, j varying from 1 to m.

Figure 6:
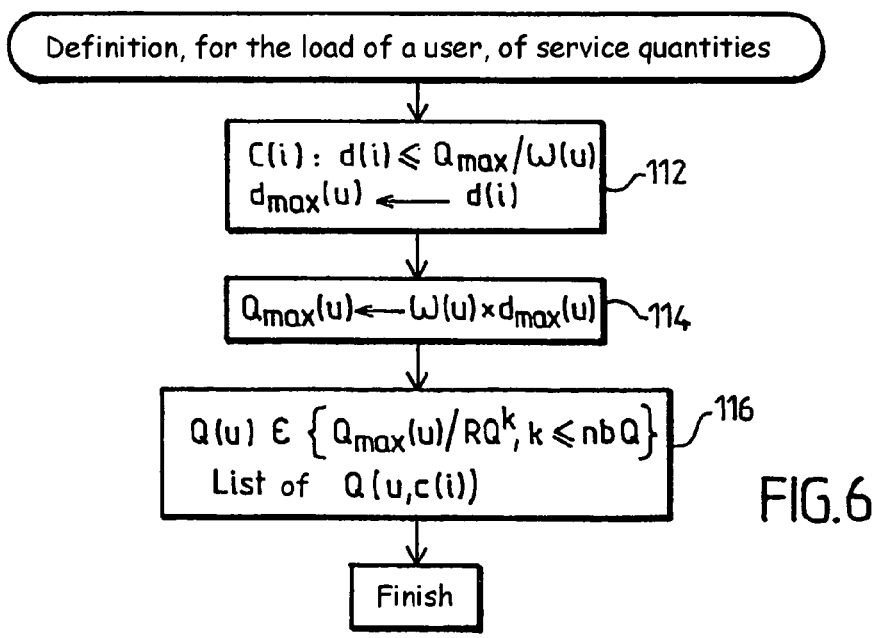
FIG. 6 represents a flow chart defining, for a given value of "share-parameter" of a user, the quantities of services allocatable to this user, and the associated interval classes.

FIG. 6 represents a flow chart illustrating the definition of the quanta allocatable to a given user for a chosen load of this user.

At step 112, the class $c(i)$ of interval $d(i)$ is sought which allows the maximum quantum that is theoretically attributable $Q_{max}$ for the chosen load $W(u)$ not to be exceeded. This interval $d(i)$ is stored as the maximum interval $d_{max}(u)$ of the given user u.

At step 114, the maximum quantum that is really allocatable to the user entity is calculated as a function of the maximum interval found $d_{max}(u)$ such that $Q_{max}(u) = W(u) \times d_{max}(u)$.

Step 116 defines the quanta that the user will be able to request according to his requirements. These allocatable quanta $Q(u)$ assume different possible values such that $Q(u)=Q_{max}(u)/RQ^k$ with k nbQ.

Thus, for a load $W(u)$ fixed and associated with an allocatable quantum $Q(u)$ there is a corresponding class $c(i)$ of interval $d(i)=Q(u)/W(u)$. A list $Q(u, c(i))$ of these allocatable quanta is produced for the different classes $c(i)$.

Figure 7:
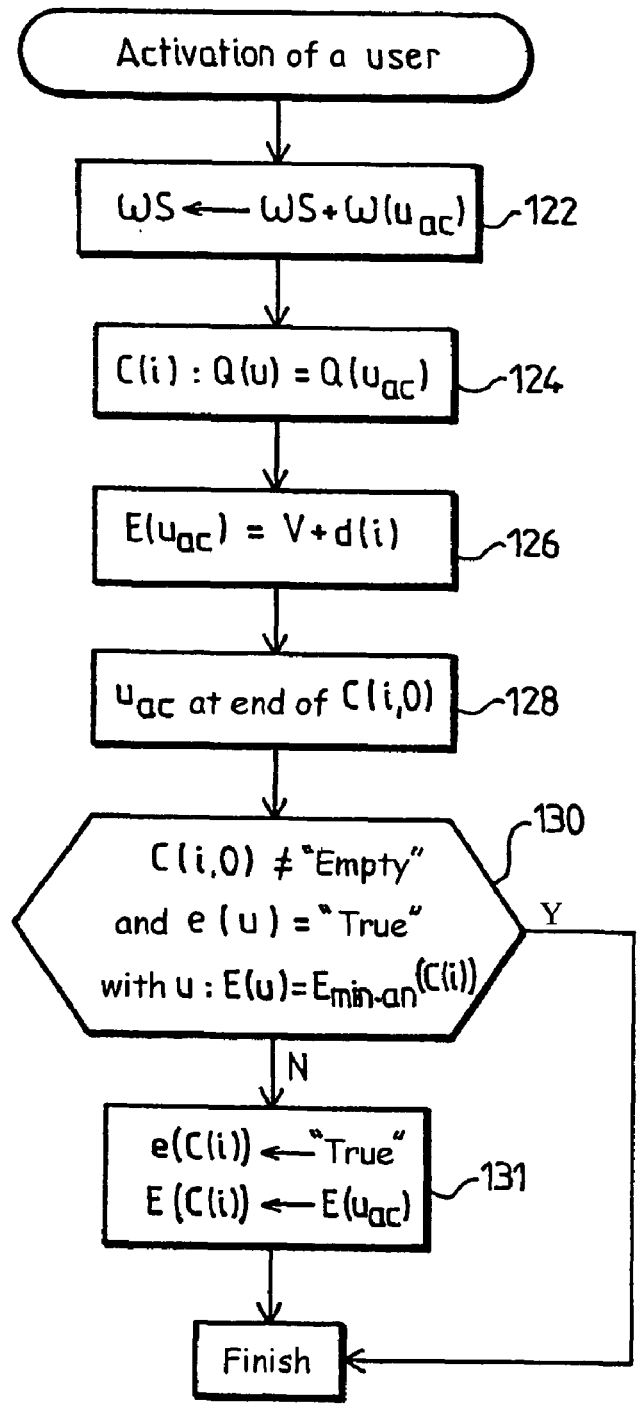
FIG. 7 represents a flow chart for activation of a user according to the invention.

FIG. 7 presents the flow chart illustrating the activation of a new user $u_{ac}$ of chosen load $w(u_{ac})$. Thus, at step 122, the total load of the resource manager is incremented by the chosen load of the activated user. The activated user requests one of the attributable quanta $Q(u_{ac})$ as defined at step 116 of FIG. 6. At step 124, the class $c(i)$ is deducted from the search for the interval $d(i)$ verifying the relationship $d(i) Q(u_{ac})/W (u_{ac})<d(i+1)$. The waiting time of the activated user is calculated at step 126, $E(u_{ac})$ being equal to the interval of the class added to the virtual time $V+d(i)$.

At step 128, the activated user $u_{ac}$ is inserted at the end of the queue $c(i,0)$ of the new users of class $c(i)$.

At step 130, if the queue of new users of class $c(i)$ is called "empty" (or else without user) and if the old user with minimum waiting time of the class (if there is one) was not already eligible, the class becomes eligible at step 131. $e(c(i))$ assumes the "true" value and the waiting time of the activated user $E(u_{ac})$ becomes the waiting time of the class $E(c(i))$.

Figure 8:
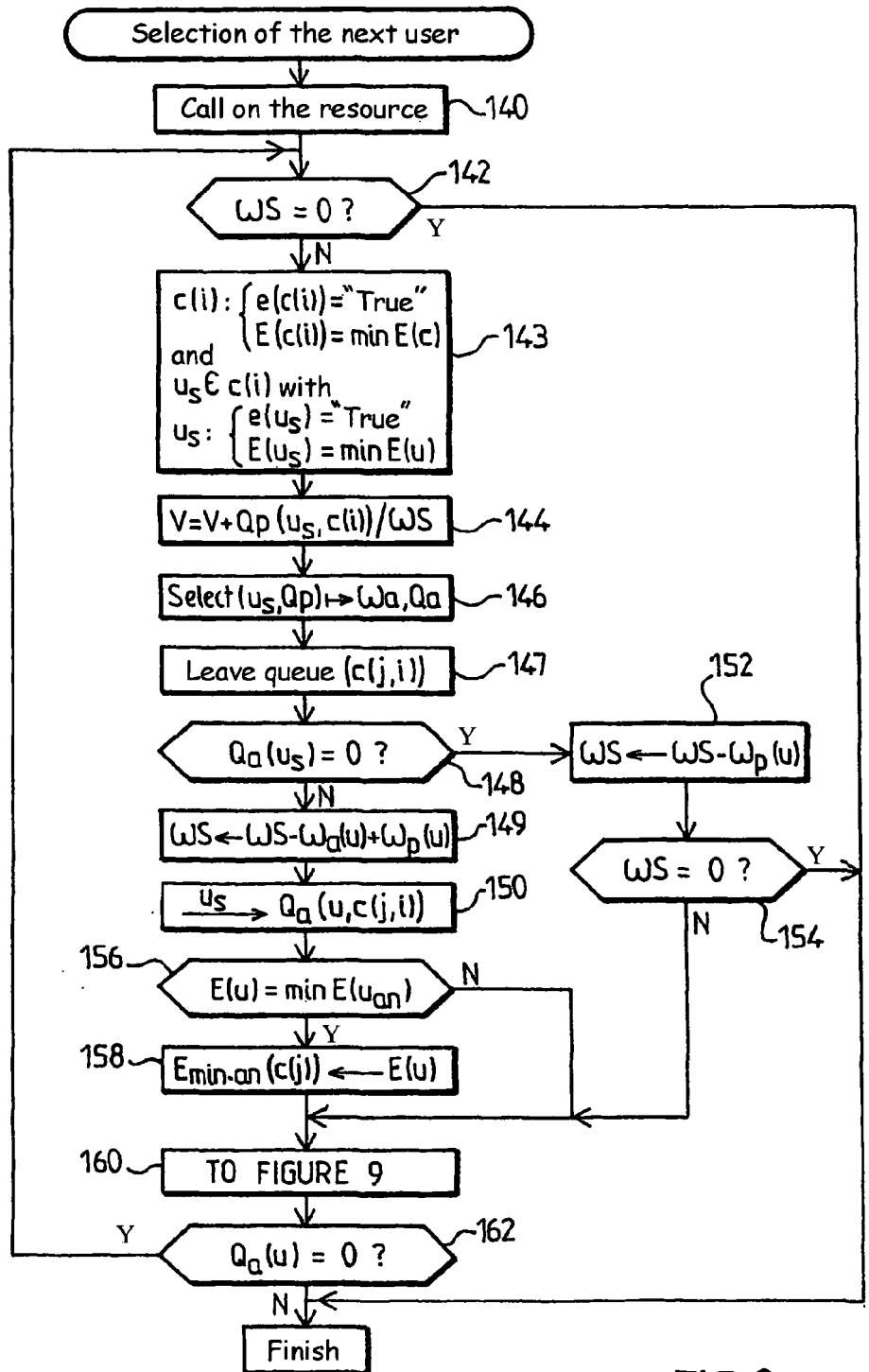
FIG. 8 represents a flow chart for selection of the next user according to the invention.
Figure 9:
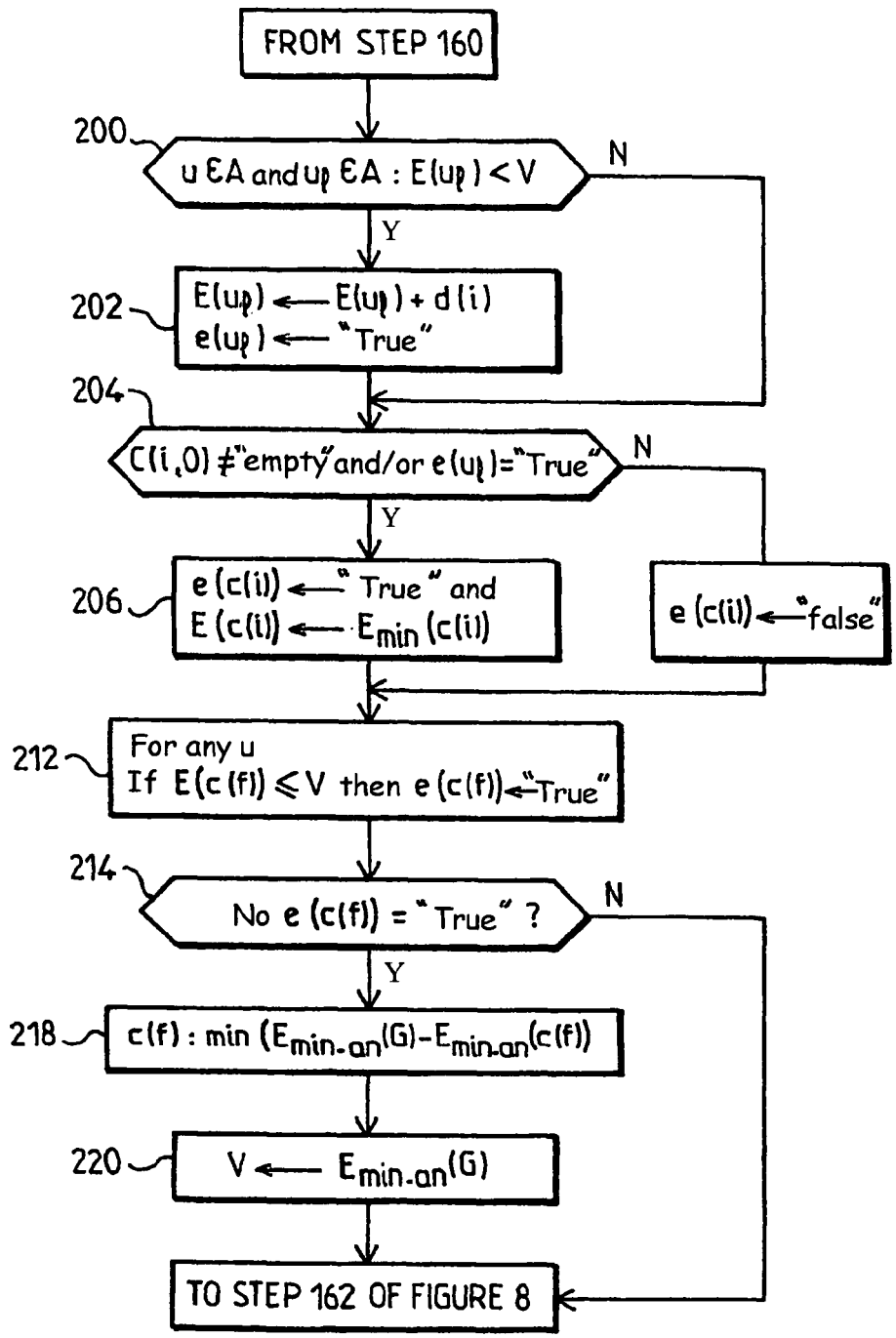
FIG. 9 represents a flow chart supplementing FIG. 8.

The flow charts of FIGS. 8 and 9 represent the algorithms used by the resources manager in order to select a user. Thus, when there is a call on the resource at step 140, the resource manager verifies whether its global load WS is nil at step 142. In the case of a nil global load, the call on the resource has no effect for a user. Otherwise, the resource manager selects the user to which it is going to allocate the resource at step 143. This selection takes place first of all on the m classes of which only the class called "eligible" and with minimum waiting time of class $E(c(i))$ is retained. Thus, among the user entities of the queues of this selected class, the eligible user entity and minimum waiting time $E(u)$ is selected, called user entity $u_s$, for a quantum $Q_D(u_s,c(i))$. The virtual time of the resource manager progresses by a quantity equal to the served quantum divided by the total load $Q_p(u_s,c(i)/WS$, at step 144. At step 146, the user is informed of his selection and is invited to request, if he wishes, a new current load value $W_a(u)$ (for which he will have to perform a fresh calculation of the allocatable quanta and interval classes corresponding to steps 112 to 116 of FIG. 6); and a new quantum value $Q_a(u)$ chosen from among those that are allocatable. The user has then left his FIFO $c(j, i)$ at step 147.

At step 148, in the case of a nil quantum requested by the user, the resource manager reduces its total load WS by the load of the user $w_p(u)$, at step 152. The resource manager verifies that no user remains in its memory, i.e. that its total load is nil, at step 154, and thus stops the allocation of the resource to the user. If, on the other hand, users remain in the memory of the resource manager, at step 154, the flow chart continues to step 160 designating FIG. 9.

If, at step 148, the quantum requested by the user for his next selection is not nil, the total load WS is then modified if necessary at step 149 in order to take account of a modification of the individual load of the selected user: $WS=WS-W_p(u)+W_a(u)$. At step 150, the served user is inserted at the end of a new FIFO of old users in the interval class corresponding on the one hand to the quantum requested for his next selection and on the other hand to his fixed load. In this class, the served user is inserted in the FIFO of old users $c(j,i)$, corresponding to the previous class $c(i)$ which he has just left and to the current class $c(j)$.

The following steps correspond to updatings of the parameters of waiting times of the classes and variables of eligibility statuses.

At step 156, if, inside his new class, the reinserted user becomes the one of which the waiting time of old users is minimum, the minimum waiting time of old users of the class $E_{min-an}(C(j))$ is updated at step 158. Otherwise, step 160 designating FIG. 9 is carried out.

FIG. 9 describes the steps preceding step 162 of FIG. 8.

At step 200, if the user u formed part of the group A designating the old users of the previous class $c(i)$ and if there exists, at the head of the FIFO of the old users, a user $u_i$ of minimum waiting time $E(u_1)$, such that $E(u_1)<V$, then step 202 is realized. The waiting time of the user $u_1$ is incremented by the interval $d(i)$ of the class $c(i)$ and the eligibility status parameter of this user $e(u_1)$ has changed to "true". Thus, in the old class of the served user, another user is made eligible with a new waiting time.

In the old class $c(i)$ of the served user, if the queue of new users of the class is not empty and/or if the old user of minimum waiting time $u_1$ has become eligible, at step 204, the class $c(i)$ becomes eligible and the waiting time of this class $E(c(i))$ assumes the value of the smallest waiting time found, at step 206. The minimum old user waiting time of the class is updated if necessary. If the criteria of the steps 204 are not satisfied, the class $c(i)$ is ineligible at step 208.

The variable f is an integer varying from 1 to m.

At step 212, the resource manager scans the m classes in order to make eligible the ineligible classes $c(f)$ the minimum waiting time $E(c(f))$ of which is exceeded by the virtual time V.

If no class is eligible, at step 214, the resource manager finds among the m classes the class of which the old users waiting time is minimum at step 218 and the virtual time V is progressed to the minimal old users waiting time of the resource manager at step 220.

After step 220 or if a class is eligible at step 214, step 162 of FIG. 8 verifies whether the quantum requested by the user is nil:

in the case of a positive reply, the algorithm resumes at step 142, in the case of a negative reply, the algorithm finishes on a state of non-allocation of the resource.

The present invention relates inter alia to the software code which it deploys, quite particularly when it is made available on any medium that is readable on a computer. The expression "medium that is readable on a computer" covers a storage medium, for example magnetic or optical, as well as a means of transmission, such as a digital or analogue signal.

The invention also relates to an computer system comprising the scheduler. By computer system is meant one or more computers, and/or any digital system capable of carrying out telecommunications and/or data transmission.

Of course, the invention is not limited to the embodiment described above by way of example, and covers other variants.

Thus, it will be understood that the present invention can apply to computer devices the operating system of which shares a central processing unit between several tasks.

It can also relate to nodes of packet switching networks (nodes of "internet" type networks etc.) which share at least one data transmission link between several information flows.

In the example described above, the allocation of the resource is by finished processing time (shared-time management) adapted in accordance with each user's request. However, the invention applies equally to an allocation using packet switching (transmission link) likewise in accordance with the requirements of each user, the requested quanta being then defined as quantities of data to be transmitted.

Generally, the invention applies to allocation by service slots that can vary over time according to the requirements of the users. Each allocation by service slot for a user is associated with a queue of users who have had the allocation of the same previous service slot. In a single class, whatever the queue in which the user finds himself in relation to the allocation of the previous service slot, an increment is defined for the class in order to count up a cumulative total for each user that is representative of the services provided to this user over time.

The number of classes provided according to the invention can be defined differently.

The invention can be expressed in the form of novel industrial products comprised of the resource-managing devices of the aforementioned type. It can also be expressed in the form of the processing applied to a computer or to a network node, in order to manage the sharing of this resource.

The series of successive quanta of a single user who remains active can be implicit. For example, the first quantum has the minimum value for the user and the following ones display a geometric progression rate QR until a stabilization at the maximum value.

As the number of classes and the number of FIFOs in each class are limited, specialist equipment for executing the most critical loops can be envisaged without its dimension introducing a limit restricting the number of users. The most critical loops, executable with each selection, relate to the examination of the ineligible classes in order to determine whether their waiting time has been reached or exceeded by the virtual time, the search for an eligible class having the least advanced waiting time, and, for any resetting of the virtual time, the search for the ineligible class having the least advanced previous waiting time.

In a particular realization of the invention, the number of users is fixed at the start, there is no management of new users, and the FIFOs of the new users are then deleted.

In another particular realization of the invention, the modification of the load of a user is limited to a set of values displaying a geometrical progression at the same rate (RQ) as the sequence of quanta values, so that the list of possible quanta values for this new load remains unchanged, only the associated classes defining time limits being modified. This minimizes the amount of calculation necessary.

In a possible realization of the invention, the FIFO memories are all associated with a first increment value and just one of these FIFO memories is associated with a second increment value corresponding to a first increment value of one of the FIFO memories.

Annex 1

$$Y(t) = \sum_{k=1}^{k=N} W(k) \tag{1}$$

$$Q_x(t) = dT \int_{a_x(t)}^{f_x(t)} Y(T) \tag{2}$$

$$q(t) = dT \int_{t_0(t)}^{t} Y(T) \tag{3}$$

$$E_x(t) = q(f_x(t)) \tag{4}$$

$$E_x(t) = q(a(t)) + Q_x/W_x \tag{5}$$

$$pV(u_s) = Q(u)_s \Big/ \sum_{k=1}^{k=N} W(k) \tag{6}$$

What is claimed is:

1. A scheduler for sharing a resource, comprising:
a memory capable of storing waiting times associated with respective user-identifiers;
a plurality of classes, each class having a first increment value;
a plurality of FIFOs storing user-identifiers, wherein each FIFO is assigned to one of the plurality of classes, and each FIFO is associated with the first increment value of the assigned class; and
a management unit configured to:
designate one of the plurality of FIFOs as next to be served by the resource based on first conditions including a comparison of waiting times associated with each user-identifier stored in a leaving first position in the plurality of FIFOs,
redirect the user-identifier stored in the leaving first position of the designated FIFO to a second FIFO, based on second conditions including a comparison between the first increment value associated with the designated FIFO and the first increment value associated with the second FIFO, and
increase the waiting time associated with the redirected user-identifier by the first increment value associated with the designated FIFO.

2. A scheduler in accordance with claim 1, wherein at least two FIFOs have the same first increment value, and wherein the management unit is further configured to pre-select first user-identifiers leaving the at least two FIFOs.

3. A scheduler in accordance with claim 2, wherein the at least two FIFOs have different second increment values.

4. A scheduler in accordance with claim 1, further comprising:
one or more groups of FIFOs, wherein every FIFO in a group has a same first increment value,
wherein the first conditions include a determination, for each group of FIFOs, of a minimum waiting time among the waiting times of first user-identifiers leaving the FIFOs in the group and the designation of a FIFO corresponding to a waiting time of the first user-identifiers that is smaller than a global value allocated to the scheduler and to the minimum waiting time of the first user-identifiers among the minimum waiting times of the groups of FIFO memories.

5. A scheduler in accordance with claim 4, wherein the second conditions include a verification of equality between the first increment value of the designated FIFO and a second increment value of the second FIFO.

6. A scheduler in accordance with claim 1, wherein the second conditions include verification of equality between the first increment value of the designated FIFO and a second increment value of the second FIFO.

7. A scheduler in accordance with claim 1, further comprising:
a specific FIFO in the plurality of FIFOs for storing an entering user-identifier.

8. A scheduler in accordance with claim 7, further comprising:
an entry decision unit configured to place a user-identifier in a FIFO, wherein the entry decision unit places the user-identifier in a FIFO having a first increment value that corresponds to a parameter linked to a relative resource requirement identified by the entering user-identifier.

9. A scheduling process for sharing a resource, comprising:
storing waiting times associated with respective user-identifiers;
storing user-identifiers in a plurality of FIFOs, each FIFO being assigned to one of a plurality of classes and having a first increment value associated with the assigned class;
designating one of the plurality of FIFOs as next to be served by the resource based on first conditions including a comparison of waiting times associated with each user-identifier stored in a leaving first position in the plurality of FIFOs;
redirecting the user-identifier stored in the leaving first position of the designated FIFO to a second FIFO, based on second conditions including a comparison between the first increment value associated with the designated FIFO and the first increment value associated with the second FIFO; and
increasing the waiting time associated with the redirected user-identifier by the first increment value associated with the designated FIFO.

10. A scheduling process in accordance with claim 9, wherein designating one of the plurality of FIFOs as next to be served by the resource comprises pre-selecting between a next to be served user-identifier of two FIFOs having the same first increment value.

11. A scheduling process in accordance with claim 10, wherein the two FIFOs have different second increment values.

12. A scheduling process in accordance with claim 9, wherein at least two of the FIFOs have the same first increment value and different second increment values.

13. A scheduling process in accordance with claim 9, wherein designating one of the plurality of FIFOs as next to be served by the resource includes grouping FIFOs having the same first increment value and, for each group of FIFO memories having the same first increment value, determining a minimum waiting time among the waiting times of the first user-identifier leaving FIFOs having the same first increment value, and designating a FIFO corresponding to a waiting time of the first user-identifiers smaller than a global value of the scheduling process and to the minimum waiting time of the first user-identifiers among the minimum waiting times of the groups of FIFOs having the same first increment value.

14. A scheduling process in accordance with claim 13, wherein the second conditions including verifying equality between a second increment value of the FIFO where the user-identifier is going and the first increment value of the FIFO from where the user-identifier is coming.

15. A scheduling process according to claim 9, further comprising designating a specific FIFO for storing an entering user-identifier.

16. A scheduling process according to claim 15, wherein designating a specific FIFO for storing an entering user-identifier includes, upon entry of a user, placing a corresponding user-identifier in a FIFO memory having a first increment value that corresponds to a parameter linked to the relative resource requirement of the entering user-identifier.

17. A non-transitory computer-readable storage medium encoded with instructions for performing a computer process, the computer process comprising:
storing waiting times associated with respective user-identifiers;
storing user-identifiers in a plurality of FIFOs, each FIFO being assigned to one of a plurality of classes and having a first increment value associated with the assigned class;
designating one of the plurality of FIFOs as next to be served by the resource based on first conditions including a comparison of waiting times associated with each user-identifier stored in a leaving first position in the plurality of FIFOs;
redirecting the user-identifier stored in the leaving first position of the designated FIFO to a second FIFO, based on second conditions including a comparison between the first increment value associated with the designated FIFO and the first increment value associated with the second FIFO; and
increasing the waiting time associated with the redirected user-identifier by the first increment value associated with the designated FIFO.

18. A computer-readable storage medium in accordance with claim 17, wherein at least two FIFOS have the same first increment value.

19. A computer-readable storage medium in accordance with claim 18, wherein the computer process further comprises pre-selecting first user-identifiers leaving the at least two FIFOS having the same first increment value.

20. A computer-readable storage medium in accordance with claim 18, wherein the at least two FIFOS have different second increment values.

* * * * *